United States Patent
Bechamps et al.

[11] Patent Number: 5,869,785
[45] Date of Patent: Feb. 9, 1999

[54] WIRE CLAMP WITH PARALLEL GRIPPING ACTION

[75] Inventors: Ronald D. Bechamps, Hightstown, N.J.; William N. Pesola, Lombard, Ill.

[73] Assignee: Antec Corporation, Norcross, Ga.

[21] Appl. No.: 872,432

[22] Filed: Jun. 10, 1997

[51] Int. Cl.⁶ .................................................. H02G 3/26
[52] U.S. Cl. ................................... 174/40 CC; 403/374
[58] Field of Search ................. 174/40 CC; 403/373, 403/374; 248/49, 53, 63

[56] References Cited

U.S. PATENT DOCUMENTS

| | | | |
|---|---|---|---|
| 2,324,181 | 7/1943 | Tulien | 138/161 |
| 2,408,253 | 9/1946 | Diebold | 174/136 |
| 2,451,004 | 10/1948 | Antwerp | 174/41 |
| 3,425,456 | 2/1969 | Schibig | 138/162 |
| 3,428,742 | 2/1969 | Smith | 174/136 |
| 3,629,909 | 12/1971 | Riley | 403/371 |
| 3,900,698 | 8/1975 | Yotsugi | 174/5 R |
| 3,999,340 | 12/1976 | Bogese et al. | 52/147 |
| 4,407,600 | 10/1983 | Thompson | 403/23 |
| 4,453,353 | 6/1984 | Killop et al. | 52/147 |
| 4,638,611 | 1/1987 | Vaughn | 52/147 |
| 5,228,653 | 7/1993 | Libert | 248/63 |
| 5,308,026 | 5/1994 | Shaw | 248/63 |
| 5,336,846 | 8/1994 | Sachs | 174/40 CC |

FOREIGN PATENT DOCUMENTS

| | | |
|---|---|---|
| 1902 | 10/1902 | Australia . |
| 442286 | 10/1912 | France . |
| 1117189 | 7/1960 | Germany . |
| 2244667 | 4/1973 | Germany .................................. 248/63 |
| 2016694 | 10/1974 | Germany . |
| 3201573 | 7/1983 | Germany . |
| 559980 | 3/1975 | Switzerland . |
| 459851 | 2/1937 | United Kingdom . |

OTHER PUBLICATIONS

Bell Operating Company Specification CA07380, Issue 3, Nov. 5, 1986, 4 pages.

Bell Operating Company Specification SHP77SZ4463, Issue 2, Nov. 5, 1986. 3 pages.

Bell Communications Research Inc. Drawings B–552782M, B–174079M, B–552781M, B–585049Mm dated Apr. 27, 1984.

*Primary Examiner*—Nestor Ramirez
*Assistant Examiner*—Joseph Waks

[57] ABSTRACT

Wire clamp including a pair of clamping members for clamping a wire therebetween, one of the clamping members is provided with a plurality of teeth for engaging the wire, and the clamping members are provided with cooperative sliding engaging members which, upon the clamping members being forced into sliding engagement, move the plurality of teeth toward and parallel to the wire to cause the teeth to engage the wire in parallel gripping action and clamp the wire between the clamping members.

19 Claims, 5 Drawing Sheets

WIRE CLAMP WITH PARALLEL GRIPPING ACTION

BACKGROUND OF THE INVENTION

This invention relates generally to a new and improved wire clamp and more particularly relates to a new and improved drop wire clamp.

Numerous wire clamps including numerous drop wire clamps are known to the prior art. As known to one skilled in the art, a drop wire is a telephone wire or line including a plurality of telephone conductors for transmitting telephone signals and which telephone conductors are surrounded by an outer protective layer of deformable material. As is further known, a drop wire is a telephone line or wire that is dropped off at a building where a telephone subscriber resides, such as a house, condo, apartment house, or office building to provide the subscriber with telephone service. Typically, the drop wire extends from a telephone pole to the building where the telephone subscriber resides, and a drop wire clamp is used to clamp the drop wire to the building before the drop wire is connected to the telephone subscriber's telephone.

While as noted numerous wire clamps and drop wire clamps are known to the prior art, it is believed there exists a need in the art for a new and improved wire clamp and drop wire clamp providing improved gripping action between the clamp and the wire such as between a drop wire clamp and a drop wire.

SUMMARY OF THE INVENTION

It is the object of the present invention to satisfy the foregoing need in the art.

Clamping apparatus satisfying such need and embodying the present invention may include a pair of clamping members for clamping a wire therebetween; one of the clamping members is provided with a plurality of teeth for engaging the wire, and the clamping members are provided with cooperative sliding engaging members which, upon the clamping members being forced into sliding engagement, move the plurality of teeth toward and parallel to the wire to cause the teeth to engage the wire in parallel gripping action and thereby clamp the wire between the clamping members.

DESCRIPTION OF THE PREFERRED EMBODIMENT

An embodiment of the present wire clamp invention is shown in the drawings. The embodiment shown is a drop wire clamp, however, it will be understood that the present invention may be embodied in wire clamps for clamping wires other than a drop wire. The drop wire clamp embodiment shown in FIG. 1 and is indicated by general numerical designation 10. Drop wire clamp 10 includes a generally longitudinally extending housing indicated by general numerical designation 12 and a slide indicated by general numerical designation 14. The housing 12 and slide 14 are shown separately in FIG. 2.

Figures 1, 2, 2A:
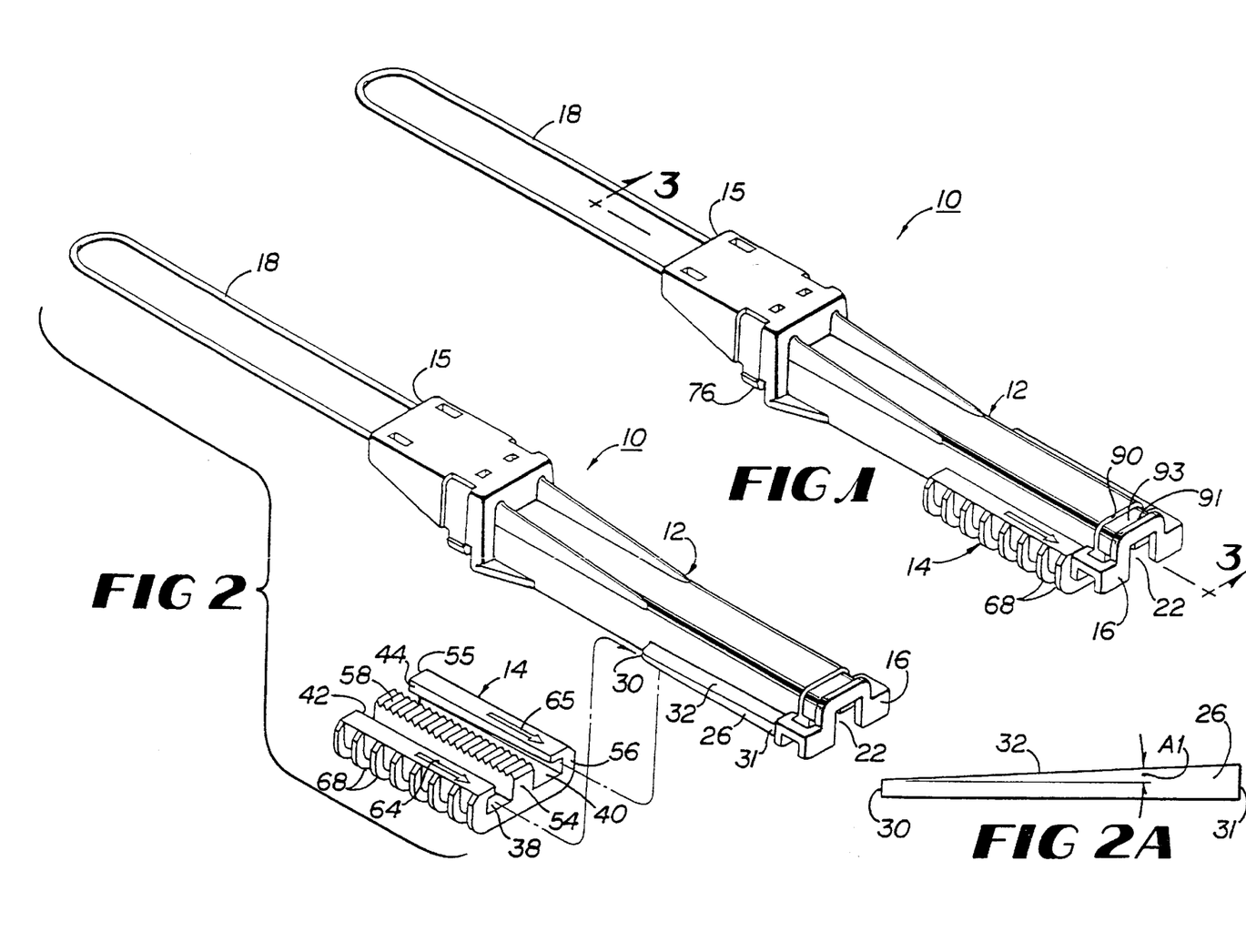
FIG. 1 is a perspective assembled view of a drop wire clamp embodying the present invention.
FIG. 2 is an exploded view, in perspective, of the drop wire clamp shown in FIG. 1.
FIG. 2A is a diagrammatical view illustrating the angle of inclination of a representative housing rail.
Figure 5:
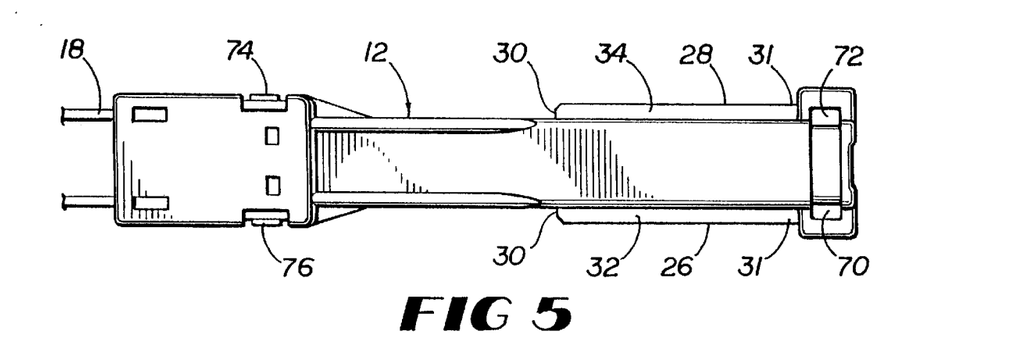
FIG. 5 is an enlarged top view of the drop wire clamp housing.
Figure 6:
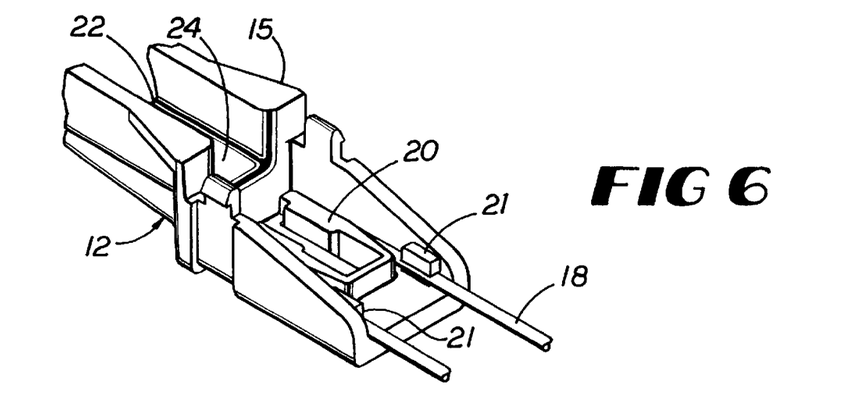
FIG. 6 is a partial perspective view illustrating the mounting of the hook to the drop wire clamp housing.

The housing 12 has a first end 15 and a second end 16. A hook of suitable material is mounted to the first end 15 of the housing 12 and is for being hooked to a support, such as another hook, mounted to a building such as a building where a telephone subscriber resides or an office building where the telephone subscriber has an office. The hook 18 is suitably shaped and is mounted to the first end 15 of the housing 12 by being wedged around mounting members 20 and 21 formed integrally with the first end 15 of the housing 12 as will be understood from FIGS. 4 and 6, particularly FIG. 6. The housing 12, FIGS. 1, 2, 4 and 6, is generally U-shaped in transverse cross-section and provides a longitudinally and inwardly extending open channel 22 for receiving a portion of the drop wire to be clamped. The U-shape is inverted as viewed in FIGS. 1, 2 and 11. Channel 22 includes a flat or planar surface 24, FIGS. 3, 4 and 6, against which a portion of the drop wire resides during clamping. It will be generally understood from FIG. 3 that upon the slide 14 being forced into sliding engagement with the housing 12 the drop wire D is clamped, in parallel gripping action as described in detail below, between the housing 12 and slide 14; it will be understood that, for clarity and avoidance of overlapping lines, the lines defining the drop wire D are shown separated from the housing 12 and slide 14 in FIG. 3; in actual practice, the slide and housing both are in engagement with the drop wire D during clamping. As will be understood from FIGS. 2 and 4, the housing 12 is provided with a pair of opposed, parallel, outwardly extending rails 26 and 28; only rail 26 is shown in FIG. 2. The rails 26 and 28, FIGS. 2, 4 and 5, have first ends 30 and second ends 31. The rails 26 and 28 provide a pair of inclined surfaces 32 and 34, both inclined surfaces being shown in FIG. 5, which are inclined upwardly from the first end 30 to the second end 31 at an angle of inclination A1 as illustrated with regard to representative rail 26 in FIG. 2A. The structure of the rails 26 and 28 may be better understood by reference to FIG. 2A and from the diagrammatical showing of representative rail 26.

Figure 7:
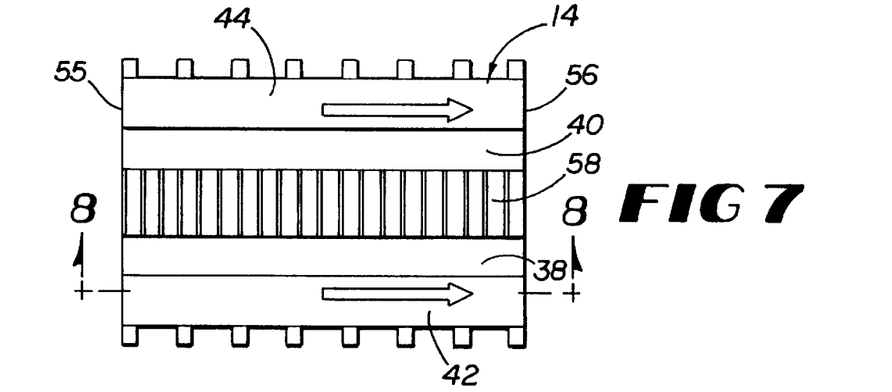
FIG. 7 is a top view of the drop wire clamp slide.
Figure 8:
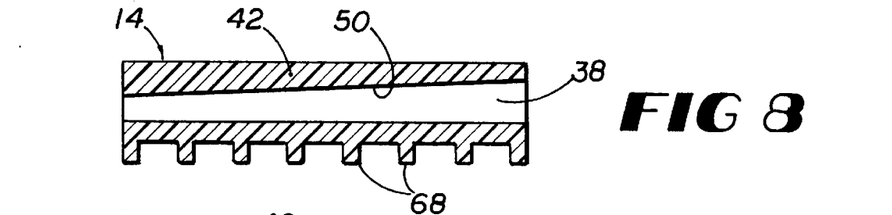
FIG. 8 is a vertical cross-sectional view taken generally along the line 8—8 in FIG. 7 in the direction of the arrows.
Figure 9:
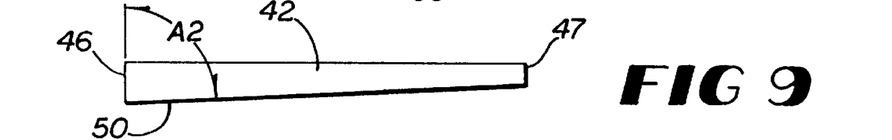
FIG. 9 is a diagrammatical view illustrating the angle of inclination of a representative slide rail.
Figure 10:
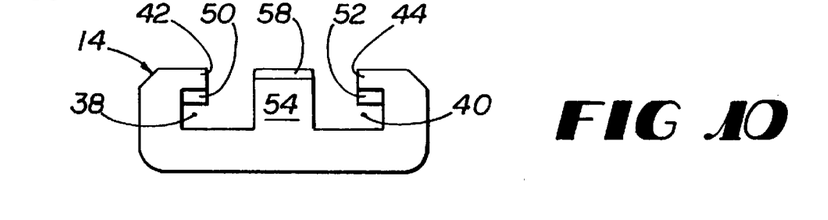
FIG. 10 is an enlarged end view of the right end of the slide as viewed in FIG. 7.

The slide 14, FIGS. 2, 7 and 8, is provided with a pair of opposed, parallel, inwardly extending, partially open channels 38 and 40 for respectively slidably receiving the rails 26 and 28 provided on the housing 12. The slide 14 is provided with a pair of opposed, parallel, inwardly extending rails 42 and 44 extending partially over the channels 38 and 40 as is best shown in FIG. 10. The pair of rails 42 and 44, as will be best understood from FIG. 9 and representative rail 42, have a first end 46 and a second end 47, and provide a pair of inclined surfaces 50 and 52 inclined upwardly from the first end 46 to the second end 47 at a second angle of inclination A2, both inclined surfaces are shown in FIG. 10. The slide 14, FIGS. 2 and 10, includes an upwardly extending central portion 54 intermediate the pair of channels 38 and 40 and the rails 42 and 44; the central portion 54 is spaced from the rails 42 and 44, as shown in FIG. 10, to provide openings between the central portion 54 and the rails 42 and 44 which permit the rails 26 and 28 provided on the housing 12 to enter the slide 14 which permit the rails 26 and 28 provided on the housing 12 to enter and reside slidingly in the pair of channels 38 and 40. The slide 14, FIGS. 2 and 7, has first and second ends 55 and 56, and the central portion 54 of the slide 14 is provided with a row of upwardly extending teeth indicated by general numerical designation 58. It will be understood from FIG. 2 that the teeth 58 are inclined at an oblique angle from the second end 56 to the first end 55 of the slide 14. From FIG. 2, it will be further understood that the teeth 58 terminate upwardly in outwardly extending or points or pointed tips, and from FIG. 10 it will be further understood that the top portions of the rails 42 and 44 and the pointed tips of the teeth 58 lie in a single plane extending substantially through the top portions of the rails 42 and 44 and the pointed tips of the teeth 58.

Figure 11:
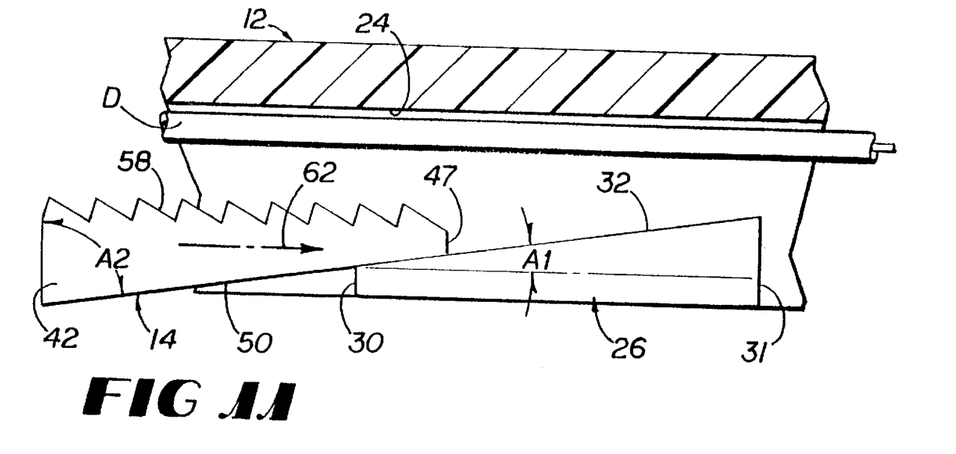
FIGS. 11–13 are side elevational, in partial cross-section, diagrammatical illustrations illustrating the sliding engagement between the drop wire clamp housing and drop wire clamp slide to clamp a drop wire between the housing and slide in parallel clamping action.
Figure 12:
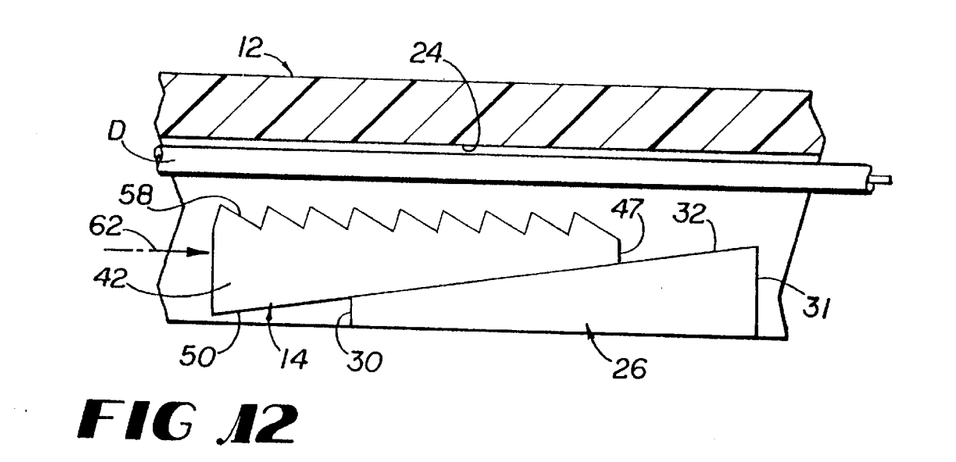
Figure 13:
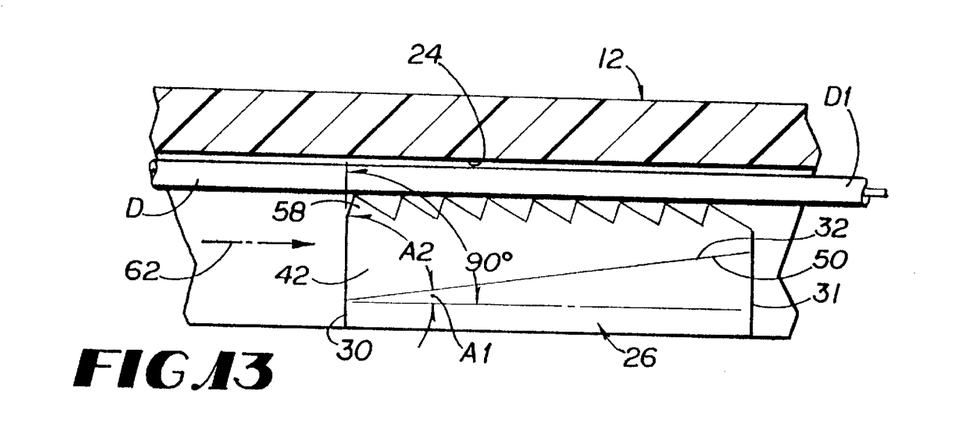

Referring now to the diagrammatical illustrations shown in FIGS. 11–13, the parallel gripping action provided by the drop wire clamp 10 of the present invention is illustrated diagrammatically in FIGS. 11–13 with regard to representative rail 26 provided on the housing 12 and representative rail 42 provided on the slide 14. The drop wire D is inserted into the channel 22 of the housing 12 (FIG. 1) to engage or reside against the flat surface 24 of the channel 12. In FIGS. 11–13, it will be understood that the drop wire 12 is shown spaced from the flat surface 24 for convenience of illustration and the avoidance of overlapping lines defining the outer boundaries of the flat surface 24 and the drop wire D; it will be recalled, and as noted above, that the drop wire D includes a plurality of internal telephone conductors surrounded by an outer protective layer of deformable material. As shown in FIG. 11, the second end 47 of the slide rail 42 is placed in engagement with the first end 30 of the housing rail 26 and relative movement is produced between the slide 14 and the housing 12 as indicated by the arrow 62 in FIGS. 11–13. For convenience of operation, it will be understood, from FIG. 2, that arrows 64 and 65 may be placed on the slide 14 to indicate this direction of relative movement and to assist the operator in clamping the drop wire D between the housing 12 and slide 14. It will be understood that such relative movement may be produced by holding the housing 12 stationary and moving the slide in the direction of the arrows 64 and 65 in FIG. 3, or the slide 14 could be held stationary and the housing 12 moved in a direction opposite to the arrows 64 and 65, and further alternatively, the slide 24 could be moved in the direction of the arrows 64 and 65 and the housing moved in the opposite direction. In the illustration of FIGS. 11–13, it will be presumed that the housing 12 is held stationary and that force is applied to the housing 14 to provide the relative movement in the direction indicated by the arrow 62 in these FIGS. As this force is applied to the slide 14, the inclined surface 50 of the slide rail 42 engages and slides upwardly of the inclined surface 32 of the housing rail 26 and as this sliding movement occurs, as will be noted particularly from FIGS. 12 and 13, the slide 14 and representative rail 42 are moved toward and parallel to the flat surface 24 of the housing 12, and in particular it will be understood that the pointed tips of the row of teeth 58 move toward and parallel to the flat surface 24 and the drop wire D. This movement continues until the slide rail 42 and the housing rail 26 occupy the relative positions shown in FIG. 13, whereupon, it will be understood that all the pointed tips of the teeth 58 have simultaneously engaged and dug into the outer protective layer of the deformable material of the drop wire D in parallel gripping action thereby to clamp the drop wire D between the housing 12 and the slide 14. It further will be understood from FIG. 13 that the angle of inclination A1 of the housing rails 26 and 28 and the angle of inclination A2 of the slide rails 42 and 44 are complementary angles and that they combine to form an angle of 90°.

It further will be understood from FIG. 13 that the rightward end D1 of the drop wire D typically would be a portion of the drop wire extending from the drop wire clamp 10 hooked to a telephone subscriber's building to a telephone pole, and it further will be understood that upon any force, indicated by the arrow 62 in FIG. 13, being applied to such end of the top wire, the drop wire will be forced into further engagement with the slide teeth 58 due to their oblique inclination, as taught above, from the second end 56 to the first end 55 of the slide 14, FIG. 7.

Referring again to FIGS. 11–13, it further will be understood that, to unclamp the drop wire from between the housing 12 and the slide 14, relative movement of the slide 14 with respect to the housing 12 in the direction opposite to the arrow 62 in FIGS. 11–13 is produced, and upon such movement, the rail inclined surface 50 slides downwardly of the inclined surface 32 of the housing rail 26 to cause the slide 14 to move away from and parallel to the housing 12 and to cause the row of teeth 58 to disengage from the layer of deformable material of the drop wire D and to move away from and parallel to the housing flat surface 24 to disengage the pointed tips of the teeth 58 from the outer protective layer of deformable material of the drop wire and thereby to unclamp the drop wire from between the housing 12 and slide 14.

From FIGS. 1, 2 and 8, it will be noted that the slide 14 is provided with a plurality of spaced apart and outwardly extending ribs 68 extending transversely to the slide pair of channels 38 and 40, and it will be understood that these ribs 68 are slide strengthening ribs and prevent the slide rails 42 and 44 from being spread apart upon the drop wire D being clamped between the housing 12 and the slide 14.

Figures 14, 15, 16:
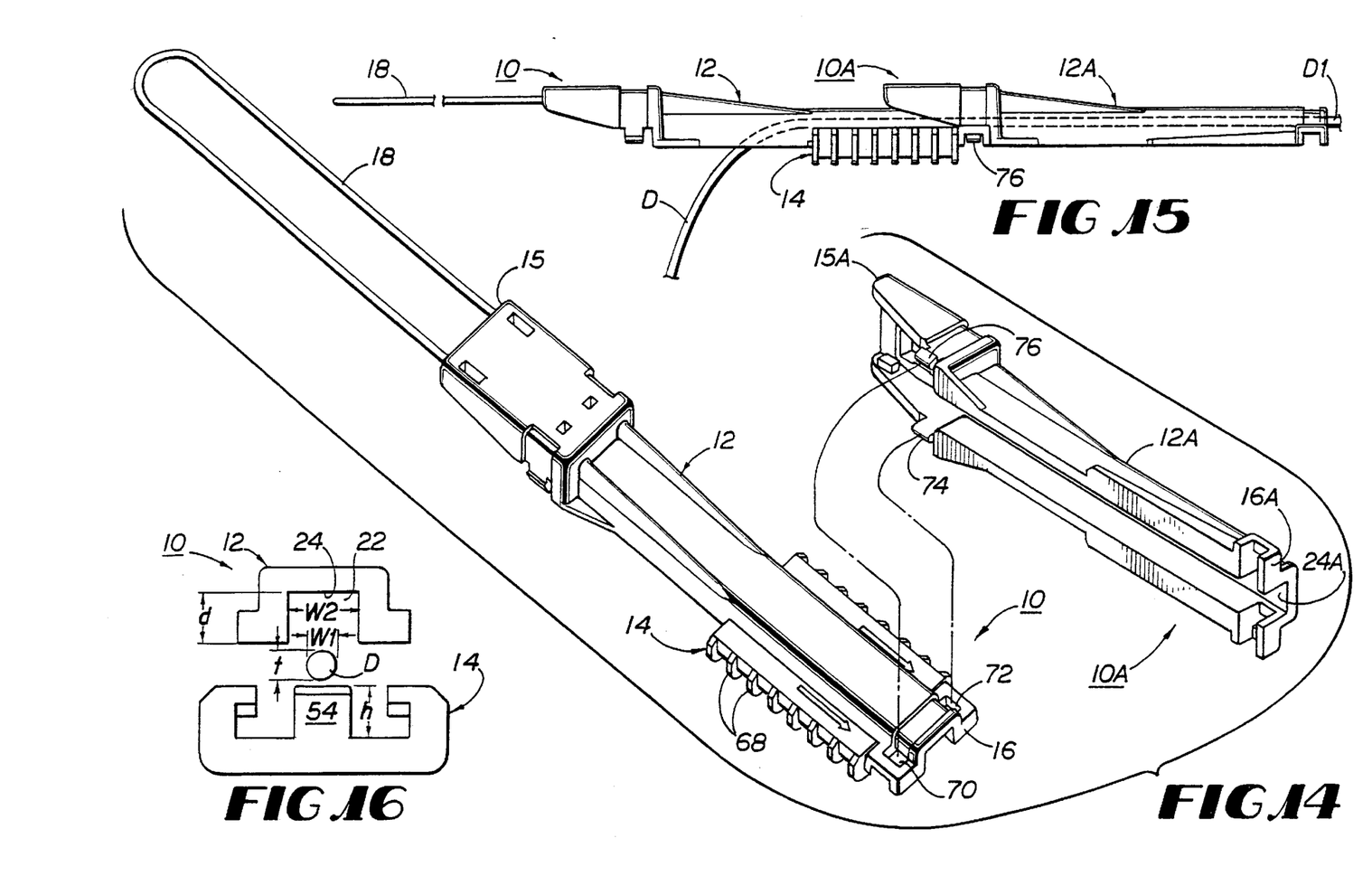
FIG. 14 is an exploded view of a further embodiment of the present invention which includes, at least, two housings of the drop wire clamp of the present invention which may be snap fitted into engagement to provide shielding and damage prevention to a portion of a drop wire extending outwardly from the drop wire clamp as shown in FIG. 3.
FIG. 15 is an assembly view of the drop wire clamp embodiment shown in FIG. 14.
FIG. 16 is an exploded diagrammatical rear elevational view illustrating the structural relationship between a drop wire and the drop wire housing and drop wire slide of the present invention.

Another feature aspect of the wire clamp of the present invention is illustrated in FIGS. 14 and 15. As is known, and referring again to the rightward portion D1 of the drop wire D in FIG. 13 described above as extending to, typically, a telephone pole, this outwardly extending portion D1 of the drop wire D extending outwardly from the clamping apparatus 10 upon the drop wire D being clamped between the housing 12 and slide 14 as illustrated in FIG. 13, typically is exposed and is subject to damage such as, for example, damage caused by rodents, such as squirrels. The squirrels walk along a telephone cable, and come across a drop wire that crosses their path and the squirrels stop and chew on the portion of the drop wire extending outwardly from the drop wire clamp. Such squirrels are known to damage the outwardly extending portion of the drop wire by biting and digging into the layer of outer protective coating of deformable material of the drop wire sufficiently to expose the internal telephone conductors and cause them to be subject to shorting upon rain falling on the damaged drop wire. This drop wire damage problem is overcome by the further embodiment 10A of the wire clamp of the present invention shown in FIGS. 14 and 15. In the drop wire clamp embodiment 10A, a second housing 12A, identical to the housing 12 except for the absent hook 18, is provided. The second end 16 of the housing 12, FIG. 14, is provided with a pair of opposed and spaced apart apertures 70 and 72 and the first end 15A of the housing 12A is provided with a pair of opposed and spaced apart downwardly extending tabs or projections 74 and 76 for being snap fitted into the pair of apertures 70 and 72 to engage the housings 12 and 12A as shown in FIG. 15 to shield the portion D1 of the drop wire D extending outwardly of the clamping apparatus 10. The outwardly extending portion D1 of the drop wire will be received within the open channel 24A formed in the housing 12A. It further will be understood that additional housings 12A could be snap fitted together and extend outwardly rightwardly as viewed in FIG. 15 to provide further shielding to the outwardly extending drop wire portion D1. From FIGS. 1–5, it will be noted that the housing 12 also is provided at its first end 15 with a pair of spaced apart downwardly extending tabs or projections 74 and 76. Referring again to FIGS. 14 and 15, it will be understood that instead of providing the housing 12A absent the hook 18 mounted to the housing 12, another housing 12 including the hook 18 may be snap fitted to a first housing 12 including the hook 18 to provide the shielding and damage provision to the drop wire as described above. It further will be understood in accordance with the teachings of the present invention that such shielding protection of the drop wire can be achieved with reduced cost by making the housings 12 or 12A of the same shape and with the same structural features whereby an operator or installer in the field can provide such drop wire shielding and damage prevention merely by having a plurality of the same, or a single drop wire housing, available.

Figure 3:
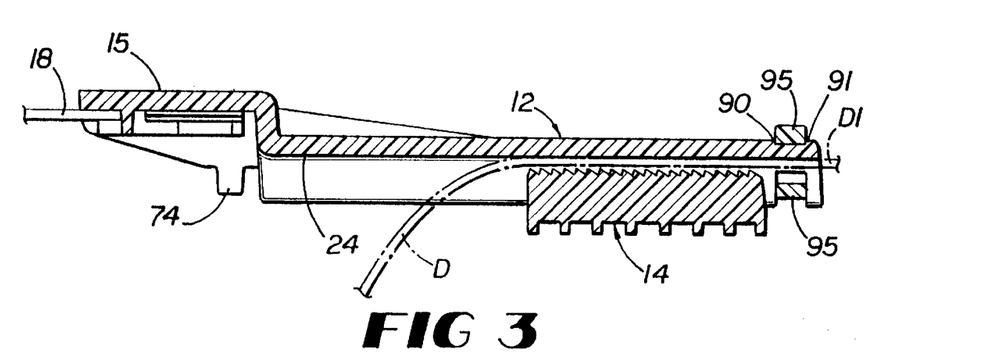
FIG. 3 is an enlarged vertical cross-sectional view taken generally along the line 3—3 in FIG. 1 in the direction of the arrows.
Figure 4:
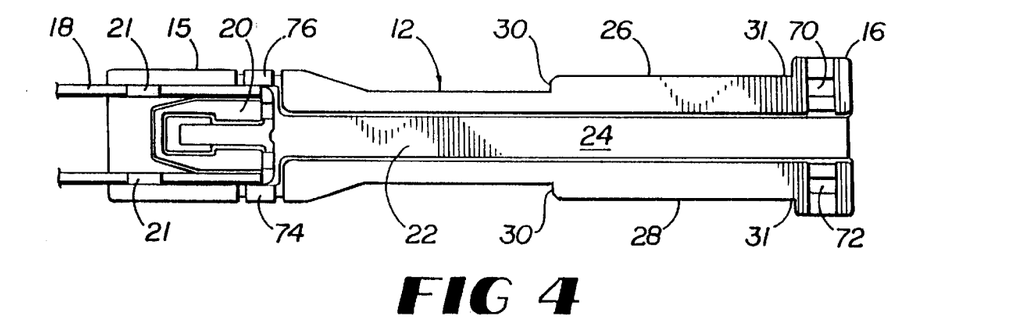
FIG. 4 is an enlarged bottom view of the drop wire clamp housing.

Referring again to FIG. 1 and to the second end 16 of the housing 12, this housing end may be provided with a pair of transverse upwardly extending ribs 90 and 91 providing therebetween an indentation or groove 93 which may be used to receive a tie wrap to further secure the drop wire, particularly the rightward portion of the drop wire D as shown in FIG. 3, to the housing 12; a representative tie wrap 95 is shown in cross-section at the right end of FIG. 3.

Referring to FIG. 16, the structural relationship between the drop wire clamp D embodiment 10 of the present invention and a typical drop wire D is shown. The drop wire D, as known to those skilled in the art, typically comes in a uniform or standard size and includes a thickness t and a width W1. The open channel 22 of the housing 12 is provided with a width W2 slightly larger than the width W1 of the drop wire D. It further will be noted from FIG. 13 that the open channel 22 has a depth d and that the central portion 54 of the slide 14 has a height h. It further will be understood in accordance with the teachings of the present invention that to insure positive and desired gripping action of the drop wire D between the housing 12 and slide 14, the depth d of the housing open channel 22 minus the height h of the slide center portion 24 is less than the thickness t of the drop wire D.

The housing 12, or 12A, and the slide 14 may be made of a suitable plastic material having the desired qualities of rigidity and flexibility such as, for example, a glass reinforced plastic such as the chemically coupled, long last fiber reinforced, heat stabilized polypropylene, Verton MFX Series available from LNP Engineering Plastics, Inc., Exton, Pa. 19341.

It will be understood that many variations and modifications may be made in the present invention without departing from the spirit and the scope thereof.

What is claimed is:

1. Drop wire clamp for a drop wire including telephone wires surrounded by an outer layer of protective deformable material, comprising:

a first housing provided with a channel for receiving said drop wire, said channel including a flat bottom against which the drop wire resides when received in said channel, said first housing a first camming means;

a slide for being forced into sliding engagement with said first housing, said slide including a plurality of pointed teeth residing substantially in a single plane and sad slide including a second camming means:

wherein upon said slide being forced into a sliding engagement with said first housing said second camming means engages said first camming means to cause said first and second camming means to cooperatively cam said slide toward and parallel to said first housing and to cam said plurality of teeth toward and parallel to said flat bottom to cause all of said teeth to simultaneously engage said outer layer of protective deformable material in a parallel gripping action to clamp the drop wire between said first housing and said slide;

wherein upon the drop wire being clamped in said drop wire clamp the drop wire includes a portion extending outwardly from said drop wire clamp and wherein said portion is subject to damage, and wherein said drop wire clamp further includes a second housing for engaging said first housing to shield the outwardly extending portion of the drop wire and to protect the outwardly extending portion from damage; and wherein said first housing is provided with a pair of apertures and wherein said second housing is provided with a pair of spaced apart resilient tabs for being snap fitted into said apertures to place said second housing in an engagement with said first housing.

2. Clamping apparatus for clamping a drop wire including an outer layer of a deformable material, comprising:

a first housing generally U-shaped in a transverse cross-section and providing an inwardly extending open channel, said first housing including a flat surface for being engaged by a portion of the drop wire when said drop wire is in said open channel, said first housing provided with a pair of opposed, parallel, outwardly extending first rails having first and second ends, said pair of first rails providing a first pair of inclined surfaces inclined upwardly from said first end to said second end of said first rails at a first angle of inclination; and a slide provided with a pair of opposed, parallel, inwardly extending partially open slide channels for slidably receiving said first rails, said slide provided with a pair of opposed, parallel inwardly extending second rails extending partially over said pair of slide channels, said second rails having first and second ends, said pair of second rails providing a second pair of inclined surfaces inclined upwardly from said first end to said second end of said second rails at a second angle of inclination, said slide including an upwardly extending central portion intermediate said pair of slide channels and said second rails and spaced from said second pair of rails to provide openings into said pair of slide channels which permit said first rails to enter and reside in said pair of slide channels, said slide having first and second ends and said central portion provided with a row of upwardly extending teeth inclined at an oblique angle from said second end to said first end of said slide, said pair of second rails having top portions and said row of teeth having outwardly extending pointed tips lying in a single plane extending substantially through said top portions and said pointed tips, upon relative movement of said slide parallel to said first housing in a first direction of movement said second pair of inclined surfaces sliding upwardly of said first pair of inclined surfaces to move said slide toward and parallel to said fist housing and to move said row of teeth toward and parallel to said flat surface to cause all of said pointed tips of said teeth in said row to simultaneously engage and dig into said outer layer of said deformable material of the drop wire in a parallel gripping action and to clamp the drop wire between said first housing and said slides and upon relative movement of said slide parallel to said first housing in a second direction opposite to said first direction said second pair of inclined surfaces sliding downwardly of said first pair of inclined surfaces to cause said slide to move away from and parallel to said first housing and to cause said row of teeth to disengage from said layer of said deformable material and to move away from and parallel to said flat surface to disengage said pointed tips of the teeth from the outer protective layer of deformable material of the drop wire and to unclamp the drop wire from between said first housing and said slide.

3. The clamping apparatus according to claim 2 wherein said first angle of inclination and said second angle of inclination are complementary angles combining to form an angle of 90°.

4. The clamping apparatus according to claim 2 wherein said slide is provided with a plurality of spaced apart outwardly extending ribs extending transversely to said pair of slide channels and preventing said second pair of rails on said slide from being spread apart upon the drop wire being clamped between said first housing and said slide.

5. The apparatus according to claim 2 wherein upon the drop wire being clamped between said first housing and said slide, the drop wire including an outwardly extending portion extending outwardly from said clamping apparatus and being subject to damage, and wherein said clamping apparatus further includes at least a second housing for engaging said fist housing to shield the outwardly extending portion of the drop wire and protect the outwardly extending portion from damage.

6. The clamping apparatus according to claim 2 wherein said first housing includes opposed first and second ends, wherein said first end of said first housing is provided with a hook for hooking said clamping apparatus and thereby the drop wire to a support wherein said second end of said first housing is provided with a pair of opposed and spaced apart apertures, wherein upon said drop wire being clamped between said first housing and said slide, the drop wire includes an outwardly extending portion extending outwardly from said clamping apparatus and being subject to damage, wherein said clamping apparatus her includes at least a second housing having opposed first and second ends and wherein said first end of said second housing is provided with a pair of opposed and spaced apart downwardly extending projections for being snap fitted into said pair of apertures of said first housing to engage said first end of said second housing with said second end of said first housing to cause said second housing to shield the outwardly extending portion of the drop wire and protect said outwardly extending portion from damage.

7. The apparatus according to claim 2 wherein said first housing is provided with a hook for hooking said clamping apparatus and thereby the drop wire to a support.

8. The apparatus according to claim 2 wherein said open channel provided in said first housing has a depth, wherein the drop wire has a thickness, wherein said upwardly extending central portion of said slide has a height and wherein the depth of said open channel minus the height of said central portion is less than the thickness of the drop wire.

9. An apparatus for clamping a wire therein, the wire comprising an outer layer of deformable material surrounding a conductive core, comprising:

a first housing including an open channel for receiving a length of said wire, said first housing further including a pair of opposed, generally parallel outwardly extending housing rails, wherein each of said housing rails has an inclined upper surface inclined upwardly at a first angle of inclination from a first end to a second end of each said housing rail; and a slide having, a pair of opposed, generally parallel, partially open slide channels for slidably receiving each of said housing rails, said slide also having a pair of opposed, generally parallel, inwardly extending slide rails, wherein each of said slide rails has an inclined lower surface inclined upwardly at a second angle of inclination from a first end to a second end of each said slide rail, said slide further including a central portion extending upwardly between said slide rails, said central portion having an upper surface having teeth projecting therefrom;

wherein said slide is removably and slidably engaged with said first housing such that the inclined lower surface of each respective of said slide rails is positioned on the inclined upper surface of each respective of said housing rails, and wherein when said slide is moved in a first direction parallel to said first housing, said teeth on said central portion of said slide are brought into contact with said outer layer of deformable material of said wire, thereby clamping said wire within said open channel in said first housing.

10. The apparatus of claim 9 wherein each of said slide channels is defined in said slide between said central portion and each of said slide rails, wherein each said slide channel is dimensioned to sidably receive a respective housing rail therein.

11. The apparatus of claim 9 wherein said inclined upper surface of each of said housing rails is oriented at a first angle of inclination, and wherein said inclined lower surface of each of said slide rails is oriented at a second angle of inclination, and wherein said first and second angles of inclination combine to form an angle of approximately 90 degrees.

12. The apparatus of claim 9 wherein said central portion of said slide is spaced from each of said slide rails to provide an opening into said respective slide channel to permit each respective housing rail to enter each respective slide channel.

13. The apparatus of claim 9 wherein when said slide is slidably connected to said first housing and moved in said first direction relative to said first housing, the upper surface of said slide moves upwardly toward said wire in said open channel in said first housing, and when said slide is moved in a second direction parallel to said first housing, the upper surface of said slide moves downwardly away from said wire in said open channel in said first housing.

14. The apparatus of claim 9 wherein said open channel in said first housing has a flat surface defining a plane, and wherein said upper surface of said central portion of said slide remains generally parallel to said plane of said flat surface of said open channel in said first housing when said slide is moved parallel to said first housing.

15. The apparatus of claim 9 wherein said slide is provided with a plurality of spaced apart outwardly extending ribs extending transversely to said slide channels for preventing said slide rails from being spread apart when said wire is clamped between said first housing and said slide.

16. The apparatus of claim 9 wherein upon s aid wire being clamped between said first housing and said slide, said wire has an outwardly extending length extending outwardly from said first housing, and wherein said apparatus further comprises a second housing connected to said first housing to shield and protect said outwardly extending length of said wire from damage.

17. The apparatus of claim 16 wherein said first housing includes a pair of apertures and wherein said second housing includes a pair of resilient tabs for being mated with said apertures of said first housing to connect said second housing to said first housing.

18. The apparatus of claim 9 wherein said first housing includes a first and second end, wherein a hook is connected to said first end of said first housing for hooking said wire to a separate support.

19. The apparatus of claim 9 wherein said open channel in said first housing has a depth, said wire in said open channel has a thickness, and said central portion of said slide has a height, and wherein the death of said open channel minus the height of said central portion is less than the thickness of said wire.

\* \* \* \* \*